(12) United States Patent
Rendler

(10) Patent No.: US 12,071,315 B2
(45) Date of Patent: Aug. 27, 2024

(54) METHOD AND DEVICE FOR SEPARATING SAWN TIMBER PACKS INTO MAIN YIELD AND SIDE CUTTINGS

(71) Applicant: Gebrüder Linck "Gatterlinck" Maschinenfabrik GmbH & Co. KG, Oberkirch (DE)

(72) Inventor: Martin Rendler, Lautenbach (DE)

(73) Assignee: Gebrüder Linck "Gatterlinck" Maschinenfabrik Gmbh & Co. KG, Oberkirch (DE)

( * ) Notice: Subject to any disclaimer, the term of this patent is extended or adjusted under 35 U.S.C. 154(b) by 194 days.

(21) Appl. No.: 17/780,102

(22) PCT Filed: Nov. 13, 2020

(86) PCT No.: PCT/EP2020/082034
§ 371 (c)(1),
(2) Date: May 26, 2022

(87) PCT Pub. No.: WO2021/104895
PCT Pub. Date: Jun. 3, 2021

(65) Prior Publication Data
US 2022/0411202 A1 Dec. 29, 2022

(30) Foreign Application Priority Data
Nov. 26, 2019 (DE) ...................... 10 2019 132 031.3

(51) Int. Cl.
*B27B 25/02* (2006.01)
*B27B 31/08* (2006.01)
(Continued)

(52) U.S. Cl.
CPC ............. *B65G 47/82* (2013.01); *B65G 13/02* (2013.01); *B65G 21/2072* (2013.01); *B65G 39/18* (2013.01)

(58) Field of Classification Search
CPC .... B65G 13/02; B65G 21/2072; B65G 39/18; B65G 47/82; B27B 25/02; B27B 31/08
(Continued)

(56) References Cited

U.S. PATENT DOCUMENTS 3,687,239 A * 8/1972 Moehlenpah ......... B30B 15/028
188/38
3,732,765 A 5/1973 Fritz et al.
(Continued)

FOREIGN PATENT DOCUMENTS

DE 322282 6/1920
DE 2428440 1/1976
(Continued)

OTHER PUBLICATIONS

US 2023/0146108 A1, Haas, May 11, 2023.*

*Primary Examiner* — Douglas A Hess
(74) *Attorney, Agent, or Firm* — Volpe Koenig

(57) ABSTRACT

In a method for separating a sawn timber pack obtained from one trunk into main yield and side cuttings using a separating conveyor, the sawn timber pack is conveyed in a longitudinal direction via an underside transport device of the separating conveyor. While the single- or multi-piece main yield is supported by the transport device, one or more side boards are separated transverse to the conveying direction using gravitational force and/or external forces, whereby lateral retaining elements are briefly opened for release. In order to be able to process trunks with as large a diameter range as possible, the side boards located on opposing sides of the sawn wood pack are separated in two successive separating stages, whereby the lateral retaining elements of the separating conveyor are opened on one side on a respective release side in the successive separating stages.

17 Claims, 3 Drawing Sheets

(51) Int. Cl.
*B65G 13/02* (2006.01)
*B65G 21/20* (2006.01)
*B65G 39/18* (2006.01)
*B65G 47/82* (2006.01)

(58) Field of Classification Search
USPC .............................. 198/348; 83/23, 102, 109
See application file for complete search history.

(56) References Cited

U.S. PATENT DOCUMENTS

| | | | | |
|---|---|---|---|---|
| 3,744,360 A | * | 7/1973 | Currie ..................... | B65B 61/06 |
| | | | | 83/225 |
| 3,903,771 A | * | 9/1975 | Fritz ....................... | B27B 15/08 |
| | | | | 83/368 |
| 3,990,568 A | * | 11/1976 | Wilson, Sr. ............. | B27B 25/02 |
| | | | | 144/246.2 |
| 6,240,821 B1 | * | 6/2001 | Landers .................. | B27B 31/06 |
| | | | | 83/419 |

FOREIGN PATENT DOCUMENTS

| | | |
|---|---|---|
| DE | 2753912 | 6/1979 |
| DE | 3007379 | 10/1980 |
| DE | 2947189 | 5/1981 |
| DE | 3103575 | 11/1981 |
| DE | 3317137 | 12/1983 |
| DE | 202006012507 | 1/2008 |
| DE | 102008063511 | 7/2010 |
| EP | 0076241 | 4/1983 |
| EP | 1889698 | 2/2008 |
| SU | 1350008 A1 | 11/1987 |
| WO | 9218301 | 10/1992 |
| WO | 9218302 | 10/1992 |

* cited by examiner

METHOD AND DEVICE FOR SEPARATING SAWN TIMBER PACKS INTO MAIN YIELD AND SIDE CUTTINGS

TECHNICAL FIELD

The present invention concerns a method for separating a sawn timber pack obtained from one trunk into main yield and side cuttings by means of a separating conveyor, wherein the sawn timber pack is conveyed in the longitudinal direction via an underside transport device, and while the single-piece or multipiece main yield is supported by the transport device, one or more side boards are separated transversely to the longitudinal direction using gravitational force.

The invention furthermore concerns a corresponding separating conveyor with an underside transport device and controllable lateral retaining elements, and with a control device which is configured to open the lateral retaining elements for ejection of one or more side boards.

BACKGROUND

In sawmills, tree trunks are cut along their longitudinal axis by a sawing device, in particular a moving saw. Since the trunks differ in size, they are measured in order to determine a cut optimized for the trunk form. During cutting, boards are obtained which are present as a sawn timber pack. The sawn timber pack here comprises a single or multipiece main yield core and side cuttings consisting of one or more side boards. The main yield is situated in an internal region of the sawn timber pack, while the side cuttings are situated on the sides of the sawn timber pack. Since the main yield and side cuttings are usually provided for different purposes, they are separated after cutting and processed separately.

For efficiency reasons, the main yield and side cuttings are separated during longitudinal transport by means of a separating conveyor. Such a separating conveyor as described in DE 202006012507 U1. There, the main yield lies on an underside transport device and is transported thereby in the longitudinal direction, while the side cuttings are pressed onto the main yield by retaining elements. In order now to separate the side cuttings from the main yield, the retaining elements are briefly opened on both sides of the sawn timber pack so that the side boards on both sides fall down.

As a transport device, transport rollers are used. In order to be able to adapt the transport device to main yield packs of different thickness, it must be adjustable in width. To this end, successive transport rollers are configured so as to be displaceable relative to one another in the transport direction so they can be arranged laterally offset to one another. The maximum adjustment width which can be achieved thereby is three times the roller width if namely, starting from the center position in which all rollers are situated centrally, one roller is arranged to the left and one to the right of the central roller. This gives an adjustment range between a minimum of one roller width and a maximum of three roller widths. This means a restriction for the maximum and minimum trunk diameters which can be processed in such a plant.

SUMMARY

It is an object of the invention to provide a method and a device for separating a sawn timber pack obtained from one trunk into main yield and side cuttings, which do not have such restrictions for the adjustment range so that tree trunks of a greater diameter range can be processed.

This object is achieved with respect to the method by using one or more of the features disclosed herein and with respect to the device by also using one or more of the features disclosed herein. Advantageous embodiments are given below and in the claims.

In a method of the type cited initially, according to the invention it is proposed that the side boards present on opposite sides of the sawn timber pack are separated in successive separating stages, in that lateral retaining elements of the separating conveyor are unilaterally opened in the successive separating stages. By separating the ejection of the side boards on the one side and on the other side of the sawn timber pack into temporally successive steps, geometric restrictions for the maximum and minimum width of the main yield pack are lifted.

In a preferred embodiment of the invention, the transport device in the successive separating stages is adjusted transversely to the conveying direction in order to set a respective unilateral ejection edge, and in order to eject the side boards, the retaining elements on the side of the ejection edge are opened.

A lateral adjustment movement of the transport device transversely to the conveying direction thus allows a reaction to fluctuating sawn timber dimensions and/or varying positions of the side cuttings in the sawn timber pack.

Correspondingly, the separating conveyor according to the present invention comprises at least two successive separating stages for separating out, on a respective side, the side boards situated on opposite sides of the sawn timber pack. Also, a control device is provided which is configured to unilaterally open the lateral retaining elements in the successive separating stages.

The transport device thus forms a respective unilateral ejection edge in each of the two separating stages, so that in the first separating stage, the side cuttings are ejected on the one side of the sawn timber pack, and in the second separating stage, the side cuttings are ejected on the other side of the sawn timber pack.

In the first separating stage, the sawn timber pack with the main yield lies on the underside transport device, while the side cuttings are held by lateral retaining elements on both sides of the sawn timber pack. The part of the side cuttings to be ejected protrudes on one side beyond the transport device in the first separating stage, so that after opening of the retaining elements, the lateral end of the transport device forms an ejection edge on this side, while the other part of the side cuttings is situated on the opposite side of the sawn timber pack over the underside transport device.

As soon as a side cutting is to be ejected, the lateral retaining elements on the side of the ejection edge are brought into an open position. Because of this unilateral opening of the retaining elements, gravity alone—or in cooperation with an additional force—causes a separation of the side boards which protruded over the ejection edge. The lateral retaining elements situated on the other side of the sawn timber pack remain unchanged, and constitute the lateral limit according to the width of the remaining part of the cut timber pack.

After ejection of the side cuttings, the sawn timber pack leaves the first separating stage and enters the second separating stage. In the second separating stage, the sawn timber pack comprises only the main yield and the remaining side cuttings which now protrude beyond the ejection edge of the transport device on the other side. As soon as the second part of the side cuttings is to be separated from the main yield, the lateral retaining elements on the ejection side of the second separating stage are opened. Thus the second part of the side cuttings falls down unilaterally under the effect of gravity and/or an additional force along the ejection edge of the second separating stage. Surprisingly, a sequential unilateral side cutting ejection considerably increases the flexibility of the separating process. In contrast to the prior art, for the method described, only the position of the sawn timber pack relative to an individual ejection edge, and the unilateral opening of the corresponding retaining elements are relevant. Because the retaining elements on the opposite side remain closed, no second ejection edge need be present. Thus the underside transport device may have any arbitrary width and the adjustment range corresponds to the total width of the transport device. So in comparison with the prior art, the structurally induced lower limit of the adjustment range can be eliminated, so that in particular sawn timber packs with dimensions smaller than the total width of the transport device can be reliably handled.

In particular, it may be provided that the transport device is adjustable transversely to the transport direction in both separating stages, and the control device is configured to set the transport device in the successive separating stages so as to form a respective unilateral ejection edge and to open the retaining elements on the side of the ejection edge in order to eject the side boards. The width setting for adapting to different thicknesses of sawn timber packs is best made by simple transverse adjustment of the transport device relative to the lateral retaining elements.

In order to provide an adjustability, the underside transport device may be guided on rails or axles which run transversely to the conveying device and along which it is adjustable. The adjustment movement may take place via electromechanical or hydraulic actuator drives which may be controlled by the control unit.

In order to set a necessary position of the ejection edge, the control unit may receive information on the dimensions of the sawn timber pack and the position of the side cuttings within the sawn timber pack. This information is usually known, for each of the successive sawn timber packs, from the setting of the preceding sawing device. From this, depending on each sawn timber pack, an adjustment travel and an adjustment position for the underside transport device can be determined, so that its position can be adapted to the dimensions and position of the respective sawn timber pack.

In particular, formation of a unilateral ejection edge and lateral transverse adjustment of the transport device may be achieved in that the transport device is unilaterally mounted on its respective side opposite its ejection edge in both separating stages. Since the ejection of the side cuttings according to the invention takes place unilaterally within a separating stage, the other side of the transport device may be used to mount bearing components and/or drive elements for the underside transport device. In this way, the device may be configured robustly with low maintenance.

In a preferred embodiment, the separating conveyor comprises, in one or both of the separating stages, a knockoff device which is arranged on the side of the respective ejection edge. This may exert additional forces on side boards which do not detach from the main yield automatically under gravity. The design of the knockoff devices may in particular be advantageous if trunks are sawn at low temperatures and the surfaces of the main yield and side cuttings freeze together because of natural or process-induced moisture. The exertion of force by the knockoff device may be achieved both by collision of the side cuttings with a fixed element of the knockoff device, or by a movement of the knockoff device which may in particular be directed in the direction of the gravitational force.

In a further preferred embodiment, the retaining elements can be adjusted in the horizontal direction, transversely to the transport direction, on both sides in order to adapt to different dimensions of successive sawn timber packs, and on one side for opening. Thus, by setting the lateral distance of the retaining elements, an adaptation can be made to the width of the sawn timber pack, and by unilateral opening, the side boards may be ejected on the corresponding side, wherein in both cases the transport movement of the retaining elements may take place by the same actuators.

The movement of the retaining elements may in particular be rectilinear, so that simple linear drives and guides may be used. In contrast to pivot movements of the lateral retaining elements, a rectilinear travel movement is advantageous, since the retaining element may be oriented with a contact face parallel to the side of the sawn timber pack to be retained at all times. This increases the flexibility of the separating conveyor in particular with fluctuating sawn timber dimensions, in that the closed position of the respective retaining element can be set in an exclusively force-controlled fashion. In addition, a combined linear and pivot movement is conceivable.

Alternatively or in addition to a transverse adjustment of the transport device for adaptation to the dimensions of the sawn timber pack, it may also be provided that, for width setting for successive sawn timber packs, on a unilateral ejection edge formed by the transport direction, the retaining elements are laterally adjusted transversely to the transport direction on the side opposite the unilateral ejection. Thus instead of adjusting the transport device in the transverse direction, also—or in addition—the retaining elements on the side opposite the ejection, which serve as side limiters for the part of the sawn timber pack not to be ejected, may be laterally adjusted relative to the transport device.

In the closed position, the lateral retaining elements serve to guide the sawn timber pack in the transport direction in the correct position relative to the ejection edge, and retain both the main yield and the side boards. This closed position may be maintained by means of force control, whereby the reliability of the transport may be increased.

The lateral retaining elements may e.g. be formed as guide plates which may extend over part of or the entire length of the separating stage. In a preferred embodiment, several retaining rollers are provided as lateral retaining elements, and are adjustable transversely to their axes by corresponding actuator drives. The rollers support the side cuttings with little friction. A travel movement of the retaining rollers may be provoked via the control device. This may be distance-controlled or also force-controlled in order to create constant pressing conditions for the sawn timber pack and ensure the reliability of the transport and ejection.

In a preferred embodiment of the separating conveyor, several retaining rollers of a separating stage are combined into a retaining roller group, wherein the retaining rollers are mechanically coupled together such that they can only be adjusted jointly. Because of the common adjustment of several retaining rollers, fewer actuating drives and guide elements and bearing components are required. The mechanical coupling of the retaining rollers may be achieved by a retaining roller carrier which can be moved on linear guides by at least one pneumatic, hydraulic or electromechanical positioning unit.

Here it is particularly suitable if each of the separating stages comprises two or more retaining roller groups on each side. Thus, the front retaining roller groups may already be positioned for the next following sawn timber pack, while a retaining roller group further downstream is still holding together and guiding the previous one.

The separating conveyor according to the invention comprises an underside transport device on which the sawn timber pack lies and can be transported along a transport direction. Transport may take place via a friction-fit force transmission from the transport element to the sawn timber pack, and/or by form-fit carriers which allow a unique positioning of the sawn timber pack on the underside transport device.

In a preferred embodiment, the underside transport device comprises one or more transport rollers via which the sawn timber pack is moved along the conveying direction. Suitably, at least a part, preferably all of the transport rollers are driven via a drive for transporting the sawn timber pack. The drive of the individual transport rollers may be common, grouped or individual. During transport, the main yield thus lies on one or more transport rollers, the rotational movement of which causes its movement in the conveying direction. The transport rollers are here substantially cylindrical and a circumferential edge thereof forms the ejection edge for the ejection. The drive may take place conventionally via an electric machine, in particular with frequency converter or a hydraulic motor, in particular an oil motor. A gear mechanism may also be provided for achieving different conveying speeds.

Rollers are robust and not susceptible to fault, and do not become soiled quickly. In particular, smooth transport rollers offer the advantage that it is difficult for deposits to collect thereon. Furthermore, they may have a coating which can avoid or set in targeted fashion the degree of slippage between the main yield and the transport rollers. For example, the transport rollers may be operated at slightly more than the conveying speed in order to increase gaps between successive sawn timber packs.

In a further preferred embodiment, in each of the separating stages, several of the transport rollers are grouped into a respective transport roller group and the transport rollers of a transport roller group are arranged on a common carrier element. This not only simplifies installation but allows transverse adjustment of the transport roller group via a common actuator.

In particular, several transport rollers may be combined into an assembly in that they are arranged on a common carrier element, such as a crossmember or profiled carrier or carrier assembly. The carrier element may be designed uniformly for all transport roller groups and have mechanical interfaces for axle elements on which the transport rollers are mounted. Furthermore, the carrier element may have interfaces for fitting electric drives for driving the transport rollers. Also, the carrier element may have guide rails and pneumatic, hydraulic or electromechanical positioning units, via which a plurality of transport rollers can be mechanically coupled along their adjustment movement in order to form the unilateral ejection edge. In this way, the number of required components can be reduced. In particular, the transport rollers may be grouped in corresponding fashion to the grouping of the lateral retaining rollers.

In a further preferred embodiment of the separating conveyor, this comprises one or more vertically adjustable pressing rollers at the top, which are configured to exert a pressing force on the sawn timber pack during longitudinal transport. Thus, during transport, the main yield may be fixed over the entire length of the separating conveyor and secured against tilting. This is advantageous in particular if the lateral retaining elements are brought into the open position and the sawn timber pack is no longer retained on the corresponding side. In addition, main boards may project above the sawn timber pack during transport because of vibrations. Pressing rollers may here serve to push the protruding main boards back in the direction of the underside transport device, increasing the reliability of the transport.

Similarly to the lateral retaining rollers, it is also possible to combine several pressing rollers of a separating stage into a pressing roller group, wherein the pressing rollers may be mechanically coupled together such that they can only be adjusted into the respective pressing position jointly. The mechanical coupling may be formed by a common carrier element which is moved along linear guides by a pneumatic, hydraulic or electromechanical positioning unit. This may save actuating drives, guide elements and bearing components. In addition to or instead of a linear movement for adjusting the pressing rollers, a pivot movement of the pressing rollers is also conceivable. Preferably, in the latter case, i.e. if their adjustability is achieved by a pivot movement, the pressing rollers are not coupled together in groups but actuated individually.

In a further preferred embodiment of the separating conveyor, at least the underside transport device and the lateral retaining elements of the two separating stages are arranged mirror-symmetrically to one another. The mirror-symmetrical structure of the separating stages simplifies construction, installation and commissioning of the separating conveyor, since control principles can at least partially be transferred from the first separating stage to the second.

BRIEF DESCRIPTION OF THE DRAWINGS

Further advantages and embodiments are presented in the following description of exemplary embodiments with reference to the figures. The drawings show.

DETAILED DESCRIPTION

Figure 1:
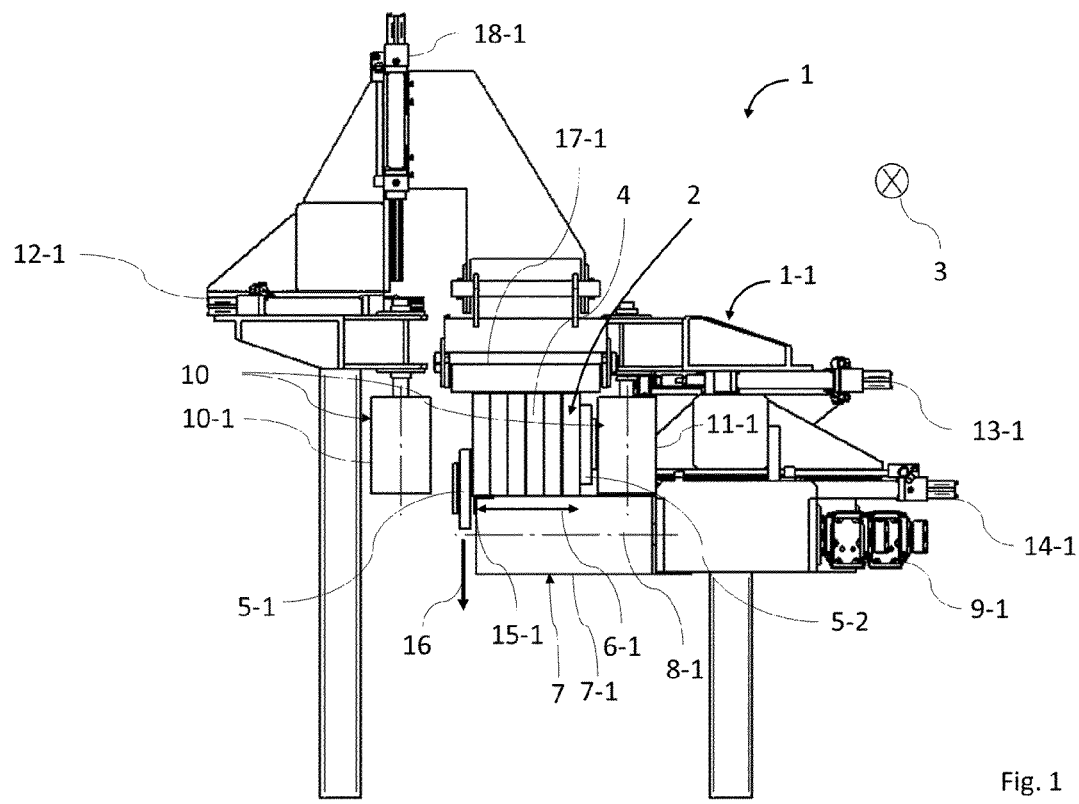
FIG. 1 a first separating stage of a separating conveyor in the transport direction of a sawn timber pack.

FIG. 1 shows a first separating stage 1-1 of a separating conveyor 1 which transports a sawn timber pack 2 in a conveying direction 3. The sawn timber pack 2 consists of the main boards 4 and the side boards 5-1 and 5-2, which are arranged on the left and right of the main boards 4 in the conveying direction 3. In FIG. 1 shown, the side boards 5-1 are separated from the main boards 4.

During transport, the main boards 4 are arranged laterally next to one another and are supported on an underside transport device 7 along a continuous support width 6-1. The transport device comprises several transport rollers 7-1 which are arranged one after the other in the transport direction.

The transport rollers 7-1 each have a rotational axis 8-1 and are connected on a bearing side to an electrical machine 9-1, which sets the transport rollers 7-1 in a rotational movement about their rotational axes 8-1. As a result, the sawn timber pack 2 is moved along the conveying direction 3.

During transport, initially the side boards 5-1 and 5-2 do not lie on the transport rollers 7-1 but are pressed by lateral retaining elements 10, in the form of retaining rollers 10-1 and 11-1, onto the main boards 4. This generates a friction force by which the side boards 5-1 and 5-2 can be transported in free-floating fashion.

The retaining rollers 10-1 and 11-1 can each be adjusted rectilinearly between a closed position and an open position. For this, linear drives 12-1 and 13-1 are used which are connected to the mounting of the retaining rollers 10-1 and 11-1. Further retaining rollers are not visible here but are arranged behind one another behind the visible retaining rollers 10-1 and 11-1. Alternatively or additionally to the linear drives 12-1 and 13-1 shown, the separating conveyor may have positioning units by means of which a pivot movement of the retaining rollers 10-1 and 11-1 can be executed.

The transport rollers 7-1 can be adjusted transversely to the conveying direction 3 along their rotational axes 8-1. The adjustment takes place via a linear drive 14-1, by means of which an ejection edge 15-1, which lies almost flush against the main yield 4, can be set before arrival of a sawn timber pack 2.

As soon as the ejection position of the first separating stage is reached, the retaining rollers 10-1 are moved away from the sawn timber pack 2 on the ejection side via the linear drive 12-1, releasing the friction connection between the side boards 5-1 and the main boards 4. Under gravity 16, the free-floating side boards 5-1 become detached from the sawn timber pack 2 and fall downward as shown. In addition, a knockoff device (see FIG. 5) may be arranged in the region of the side boards 5-1 to be separated, in order to detach these from the main yield. In addition, a slip plane (not shown here) may be used to influence the detachment speed and direction of the side boards 5-1 as required.

Pressing rollers 17-1 are formed above the sawn timber pack and arranged behind one another in the transport direction. In a pressing position, they exert pressing forces on the main boards 4, preventing undesirable vertical lifting of individual main boards from the transport roller. Also, during the ejection, the pressing rollers 17-1 serve to secure the main boards 4 against tilting.

In order to be able to handle different heights of sawn timber packs, the pressing rollers 17-1 may be moved in the vertical direction into a pressing position by means of a linear drive 18-1. Alternatively or additionally, a pivot mechanism may be provided for implementing the movement of the pressing rollers 17-1.

In order to reduce the number of bearing and drive components required, the adjustment movements of several successively arranged transport rollers 7-1, retaining rollers 10-1 and 11-1, and pressing rollers 17-1, are respectively rigidly coupled. This is shown in FIG. 2.

Figure 2:
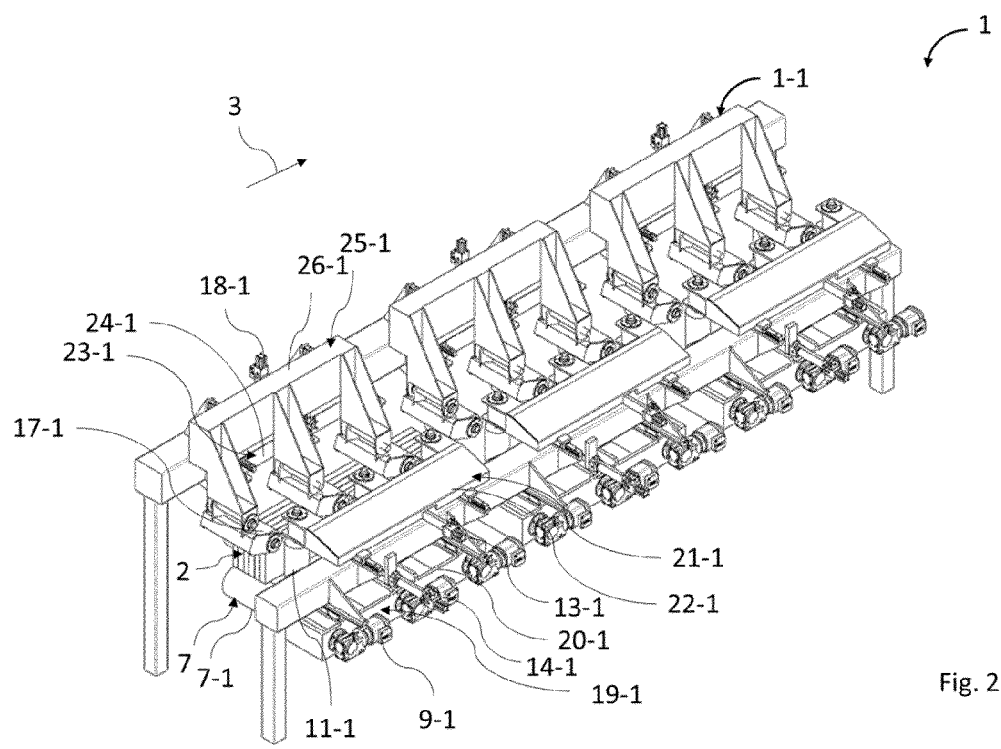
FIG. 2 an isometric view of the first separating stage.

The first separating stage 1-1 of a separating conveyor 1 shown in FIG. 2 comprises nine transport rollers 7-1, which are connected to their respective electrical machine 9-1. Of the nine transport rollers 9-1 shown, three are in each case grouped into a transport roller group 19-1. The transport rollers of the transport roller group 19-1 are formed on a common carrier element 20-1. The carrier element can be moved via a linear drive 14-1 transversely to the transport direction, whereby the ejection edge 15-1 may be set.

Furthermore, the first separating stage 1-1 comprises nine retaining rollers 11-1, of which three retaining rollers 11-1 in each case are combined into a retaining roller group 21-1. The retaining rollers 11-1 of the retaining roller group 21-1 are coupled mechanically rigidly via a carrier 22-2 which can be moved in the transport direction via the linear drive 13-1, so that the retaining rollers 11-1 of the retaining roller group 21-1 are only adjustable jointly between their respective closed position and open position.

Furthermore, the first separating stage 1-1 comprises nine retaining rollers 10-1, of which in each case three retaining rollers are grouped into a retaining roller group 23-1. The retaining rollers of the retaining roller group 23-1, like the retaining roller group 21-1, are mechanically rigidly coupled via a carrier 24-1, whereby only a common transverse adjustment of the retaining rollers 12-2 of the respective retaining roller group 23-1 can take place between an open position and a closed position.

Furthermore, the first separating stage 1-1 comprises nine pressing rollers 17-1, of which in each case three pressing rollers 17-1 are combined into a pressing roller group 25-1. The pressing rollers 17-1 of the pressing roller group 25-1 are mechanically rigidly coupled via a carrier 26-1, which can be moved vertically via the linear drive 18-1 in order to bring the grouped pressing rollers 17-1 into a pressing position. Alternatively or additionally, a pivot mechanism may be provided for achieving the movement of the pressing roller group 25-1.

Figure 3:
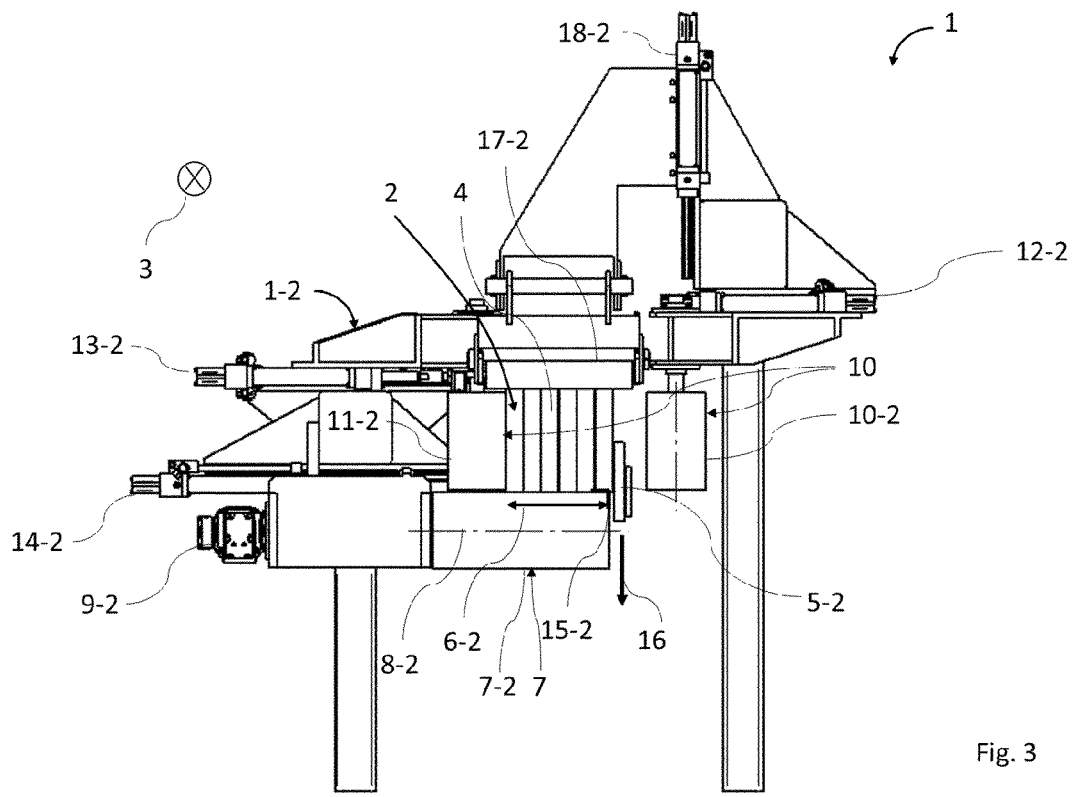
FIG. 3 a second separating stage of the separating conveyor, arranged downstream of the first separating stage.

After ejection of the side boards 5-1, the sawn timber pack 2 leaves the first separating stage 1-1 and runs into the second separating stage 1-2, which is shown in FIG. 3.

The second separating stage 1-2 is designed as a mirror image of the first separating stage 1-1.

After ejection of the side boards 5-1, the sawn timber pack 2 only comprises the main boards 4 and the side boards 5-2 which were retained in the first separating stage 1-1 and will be detached from the main yield in the second separating stage 1-2, as shown in FIG. 3.

During transport of the sawn timber pack 2 along the conveying direction 3, in the second separating stage 1-2, the main yield 4 lies along a support with 6-2 on a transport roller 7-2. This has a rotational axis 8-2 via which the transport roller 7-2 is driven on a bearing side via an electric machine 9-2.

The lateral retaining elements of the second separating stage 1-2 comprise the retaining rollers 10-2 and 11-2. These can each be adjusted rectilinearly between a closed position and an open position. For this, linear drives 12-2 and 13-3 are used, which are connected to the axles on which the retaining rollers 10-2 and 11-2 are mounted. Further retaining rollers 10-2 and 11-2 (not visible here) are arranged behind one another. Alternatively or additionally to the linear drives 12-2 and 13-2 shown, the separating conveyor may comprise positioning units with which a pivot movement of the retaining rollers 10-2 and 11-2 can be achieved.

The transport rollers 7-2 are adjustable transversely to the conveying direction 3 along a rotational axis 8-2. Adjustment takes place via a linear drive 14-2 with which an ejection edge 15-2, which lies almost flush on the main yield 4, is set before entry of a sawn timber pack 2. The ejection edge 15-2 is situated on the side opposite the ejection edge 15-1 of the first separating stage 1-1 relative to the sawn timber pack 2.

As soon as ejection position of the second separating stage 1-2 is reached, the retaining rollers 10-2 are moved away from the sawn timber pack 2 on the ejection side via the linear drive 12-2, whereby the friction connection between the side boards 5-2 and the main boards 4 is released. Under gravity 16, the free-floating side boards 5-2 become detached from the sawn timber pack 2 and fall down, similarly to the action of the first separating stage 1-1. In addition, a knockoff device (see FIG. 5) may be arranged in the region of the side boards 5-2 to be separated, in order to detach these from the main yield. In addition, a slip plane (not shown here) may be used to influence the detachment speed and direction of the side boards 5-2 as required.

Pressing rollers 17-2 are formed above the sawn timber pack and arranged behind one another in the transport direction. In a pressing position, they exert pressing forces on the main boards 4, preventing undesirable vertical lifting of individual main boards from the transport roller. Also, during the ejection, the pressing rollers 17-2 serve to secure the main boards 4 against tilting.

In order to be able to handle different heights of sawn timber packs, the pressing rollers 17-2 may be moved in the vertical direction into a pressing position by means of a linear drive 18-2. Alternatively or additionally, a pivot mechanism may be provided for implementing the movement of the pressing rollers 17-2.

In order to reduce the number of bearing and drive components required, the adjustment movements of the transport rollers 7-2, retaining rollers 10-2 and 11-2, and pressing rollers 17-2, are respectively rigidly coupled. This is shown in FIG. 4.

Figure 4:
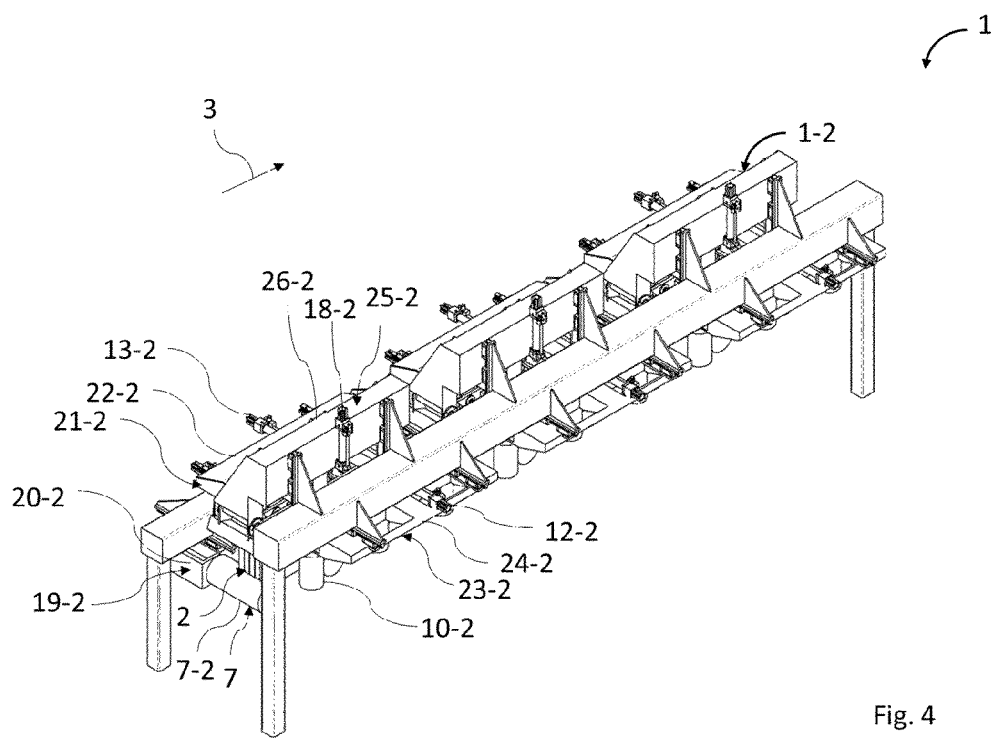
FIG. 4 an isometric view of the second separating stage.

In order to achieve a synchronous movement of the transport rollers 7-2, retaining rollers 10-2 and 11-2, and pressing rollers 17-2, these are rigidly coupled, similarly to the first separating stage 1-1, as shown in FIG. 4.

The second separating stage 1-2, shown in FIG. 4, of a separating conveyor 1 comprises nine transport rollers 7-2, which are each connected to a respective electrical machine 9-2. Of the nine transport rollers 9-2 shown, three are in each case grouped into a transport roller group 19-2. The transport rollers of the transport roller group 19-2 are formed on a common carrier element 20-2. The carrier element can be moved transversely to the transport direction via a linear drive 14-2 (not shown), whereby the ejection edge 15-2 can be set.

Furthermore, the second separating stage 1-2 comprises nine retaining rollers 11-2, of which in each case three retaining rollers 11-2 are grouped into a retaining roller group 21-2. The retaining rollers 11-2 of the retaining roller group 21-2 are mechanically rigidly coupled via a carrier 22-2, which can be moved via the linear drive 13-2 so that the retaining rollers 11-2 of the retaining roller group 21-2 can only be adjusted jointly between the closed position and the open position.

Furthermore, the second separating stage 1-2 comprises nine retaining rollers 10-2, of which in each case three retaining rollers are grouped into a retaining roller group 23-2. The retaining rollers of the retaining roller group 23-2 are mechanically rigidly coupled via a carrier 24-2, similarly to the retaining roller group 21-2, whereby only a common adjustment of the retaining rollers 12-2 of the respective retaining roller group 23-2 can take place between an open position and a closed position.

Furthermore, the second separating stage 1-2 comprises nine pressing rollers 17-2, of which in each case three pressing rollers 17-2 are combined into a pressing roller group 25-2. The pressing rollers 17-2 of the pressing roller group 25-2 are mechanically rigidly coupled via a carrier 26-2, which can be moved vertically via the linear drive 18-2 in order to bring the grouped pressing rollers 17-2 into a respective pressing position. Alternatively or additionally, a pivot mechanism may be provided for implementing the movement of the pressing roller group 25-2.

After ejection of the side boards 5-2, the sawn timber pack 2, comprising solely main boards, leaves the separating conveyor 1.

Figure 5:
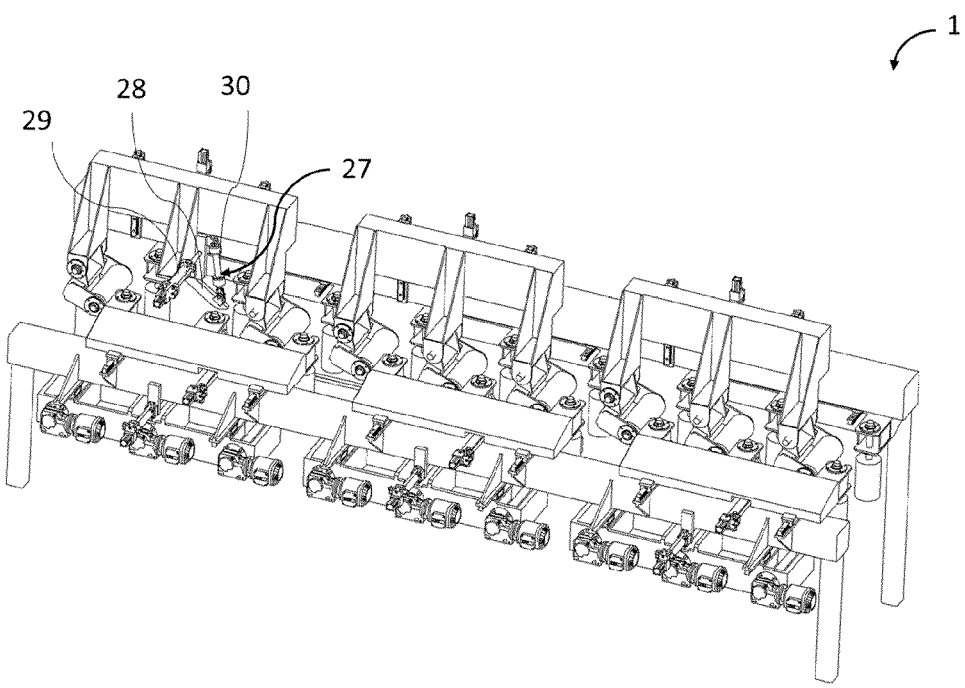
FIG. 5 an alternative embodiment of a separating stage with a knockoff device.

FIG. 5 shows an alternative exemplary embodiment of a separating stage of the separating conveyor 1. In comparison with the separating stages shown in FIGS. 1 to 4, in the separating stage shown in FIG. 5, a mechanical knockoff device 27 is arranged at the position of a pressing roller. Otherwise, the components of the separating stage in FIG. 5 are identical to those of the separating stages in FIGS. 1 to 4.

In the separating stage shown in FIG. 5, the knockoff device 27 is arranged on a carrier and comprises a knockoff arm 28 which can be adapted transversely to the conveying direction, by means of a first servo cylinder 29, to the position of the side cuttings to be knocked off. Furthermore, the knockoff device 27 comprises a second servo cylinder 30, by means of which the knockoff arm 30 can execute a knockoff movement. The knockoff device 27 is not limited in its components to two servo cylinders 28, 29 and a knockoff arm 30. Rather, the knockoff device 27 may comprise further positioning units and knockoff arms (not shown) in order to improve the knockoff position and effect. It is also within the scope of the invention to arrange the knockoff device at another suitable position or orientation in or on the separating stage, in order to increase the process reliability during separation of the side cuttings from the main yield.

The invention claimed is:

1. A method for separating a sawn timber pack (2) obtained from one trunk into main yield and side cuttings (4, 5-1, 5-2) using a separating conveyor (1), the method comprising:
   conveying the sawn timber pack (2) in a longitudinal conveying direction (3) via an underside transport device (7) of the separating conveyor (1) and, while the main yield (4), which can be single- or multi-piece, is supported by the transport device (7), separating one or more side boards (5-1, 5-2) transversely to the longitudinal direction (3) using gravitational force and/or external forces, wherein
   the separating includes separating the side boards (5-1, 5-2) present on opposite sides of the sawn timber pack (2) in successive separating stages (1-1, 1-2), and unilaterally opening lateral retaining elements (10-1) of the separating conveyor (1) in the successive separating stages (1-1, 1-2).

2. The method as claimed in claim 1, further comprising adjusting the transport device (7-1) in the successive separating stages transversely to the conveying direction (3) in order to set a respective unilateral ejection edge (15-1, 15-2), and in order to eject the side boards (5-1, 5-2), carrying out the opening of the retaining elements (10-1) on a side of the respective ejection edge (15-1, 15-2).

3. A separating conveyor for separating a sawn timber pack (2) obtained from one trunk into main yield and side cuttings (4, 5-1, 5-2) during a longitudinal transport thereof, the separating conveyor comprising:
   an underside transport device (7);
   controllable lateral retaining elements;
   a controller configured to open the lateral retaining elements (10) in order to eject one or more side boards (5-1, 5-2);
   the separating conveyor (1) comprises at least two successive separating stages (1-1, 1-2) in a transport direction for separating out, on a respective side, the side boards (5-1, 5-2) situated on opposite sides of the sawn timber pack, and the controller is configured to unilaterally open the lateral retaining elements (10) in the successive separating stages (1-1, 1-2).

4. The separating conveyor as claimed in claim 3, wherein the transport device (7) is adjustable transversely to the transport direction (3) in both of the separating stages, and the controller is configured to set the transport device (7) in the successive separating stages to form a respective unilateral ejection edge (15-1, 15-2), and to open the retaining elements on a side of the respective ejection edge in order to eject the side boards.

5. The separating conveyor as claimed in claim 4, wherein in both of the separating stages, the transport device (7) is unilaterally mounted on a respective side opposite a corresponding one of the ejection edges.

6. The separating conveyor as claimed in claim 4, further comprising a knockoff device (27) configured for mechanically detaching the side boards (5-1, 5-2) arranged in one or both of the separating stages.

7. The separating conveyor as claimed in claim 3, wherein the retaining elements are adjustable in a horizontal direction, transversely to the transport direction, on both sides in order to adapt to different dimensions of successive ones of the sawn timber packs, and on one side for opening.

8. The separating conveyor as claimed in claim 3, wherein for setting of successive ones of the sawn timber packs, on a unilateral ejection edge formed in the transport direction, the retaining elements are laterally adjustable transversely to the transport direction on a side opposite the unilateral ejection edge.

9. The separating conveyor as claimed in claim 3 wherein the retaining elements comprise vertically arranged retaining rollers (10) and the retaining rollers are laterally adjustable transversely to a rolling axis.

10. The separating conveyor as claimed in claim 9, wherein several of the retaining rollers are mechanically coupled into a respective retaining roller group (21-1, 21-2) that is configured such that the retaining rollers are jointly adjustable.

11. The separating conveyor as claimed in claim 10, wherein each of the separating stages comprises two or more of the retaining roller groups on each side.

12. The separating conveyor as claimed in claim 3, wherein the transport device comprises one or more transport rollers (7-1, 7-2) via which the sawn timber pack is moved along the conveying direction.

13. The separating conveyor as claimed in claim 12, wherein in each of the separating stages, several of the transport rollers (7-1, 7-2) are grouped in each case into a transport roller group (19-1, 19-2), and the transport rollers of each said transport roller group are arranged on a common carrier element.

14. The separating conveyor as claimed in claim 12, wherein at least some of the transport rollers are driven via a drive for transporting the sawn timber pack.

15. The separating conveyor as claimed in claim 3, further comprising one or more vertically adjustable pressing rollers (17-1, 17-2) at a top which are configured to exert a pressing force on the sawn timber pack (2) during longitudinal transport.

16. The separating conveyor as claimed in claim 15, wherein several of the pressing rollers are mechanically coupled together into a respective pressing roller group so that they are adjustable at least partially jointly.

17. The separating conveyor as claimed in claim 3, wherein at least the underside transport device (7) and the lateral retaining elements (10) of the two separating stages (1-1, 1-2) are arranged mirror-symmetrically to one another.

* * * * *